US012085086B2

(12) United States Patent
Mahadevan et al.

(10) Patent No.: US 12,085,086 B2
(45) Date of Patent: Sep. 10, 2024

(54) BEARINGS FOR ELECTRIC SUBMERSIBLE PUMPS

(71) Applicant: Schlumberger Technology Corporation, Sugar Land, TX (US)

(72) Inventors: Pradeep Mahadevan, Singapore (SG); TengFei Wang, Singapore (SG); Raju Ekambaram, Singapore (SG); Kean Wee Cheah, Singapore (SG); Sethuraj Arumugam, Singapore (SG); Kim Hoo Goh, Singapore (SG)

(73) Assignee: Schlumberger Technology Corporation, Sugar Land, TX (US)

( * ) Notice: Subject to any disclaimer, the term of this patent is extended or adjusted under 35 U.S.C. 154(b) by 290 days.

(21) Appl. No.: 17/753,792

(22) PCT Filed: Sep. 18, 2020

(86) PCT No.: PCT/US2020/051405
§ 371 (c)(1),
(2) Date: Mar. 15, 2022

(87) PCT Pub. No.: WO2021/055686
PCT Pub. Date: Mar. 25, 2021

(65) Prior Publication Data
US 2022/0341435 A1  Oct. 27, 2022

(30) Foreign Application Priority Data
Sep. 19, 2019 (SG) .............................. 10201908720Y

(51) Int. Cl.
*F04D 29/046* (2006.01)
*E21B 43/12* (2006.01)
(Continued)

(52) U.S. Cl.
CPC .......... *F04D 29/046* (2013.01); *E21B 43/128* (2013.01); *F04D 13/10* (2013.01); *F16C 17/02* (2013.01)

(58) Field of Classification Search
CPC ...... F04D 13/10; F04D 29/046; F04D 29/056; F16C 17/02
See application file for complete search history.

(56) References Cited

U.S. PATENT DOCUMENTS

2010/0166578 A1\* 7/2010 Watson ................... F16C 17/02
310/90
2015/0023815 A1   1/2015 Tetzlaff et al.
(Continued)

OTHER PUBLICATIONS

International Search Report and Written Opinion issued in the PCT Application PCT/US2020/051405, dated Nov. 30, 2020 (11 pages).

*Primary Examiner* — Charles G Freay
(74) *Attorney, Agent, or Firm* — Jeffrey D. Frantz

(57) ABSTRACT

Anti-rotation bearing assemblies for electric submersible pumps are provided. An electric submersible pump includes a plurality of centrifugal pump stages, each stage including a rotating impeller and a stationary diffuser mounted on a shaft coupled to a motor. In use, the motor rotates the shaft, which rotates the impeller within the stationary diffuser. A bearing assembly can include a bearing sleeve disposed about the shaft and a bushing disposed radially between the bearing sleeve and the diffuser. The bearing sleeve rotates with the shaft in operation, and the bushing remains stationary with the diffuser. The bushing can have an external key that is received in a key way or groove in the diffuser to act as an anti-rotation feature. In other variations, the bushing can have an eccentric or oblique profile, which can act as an anti-rotation feature.

17 Claims, 13 Drawing Sheets

(51) Int. Cl.
*F04D 13/10* (2006.01)
*F16C 17/02* (2006.01)

(56) References Cited

U.S. PATENT DOCUMENTS

| | | |
|---|---|---|
| 2015/0226219 A1 | 8/2015 | Johnson et al. |
| 2016/0115998 A1 | 4/2016 | Jayaram et al. |
| 2017/0159668 A1* | 6/2017 | Nowitzki ................. F16C 35/02 |
| 2018/0017066 A1 | 1/2018 | Nowitzki et al. |
| 2018/0045209 A1* | 2/2018 | Nowitzki .............. F16D 1/0876 |
| 2018/0291917 A1 | 10/2018 | Webster et al. |
| 2021/0071683 A1* | 3/2021 | Nowitzki .................. F04D 1/06 |

* cited by examiner

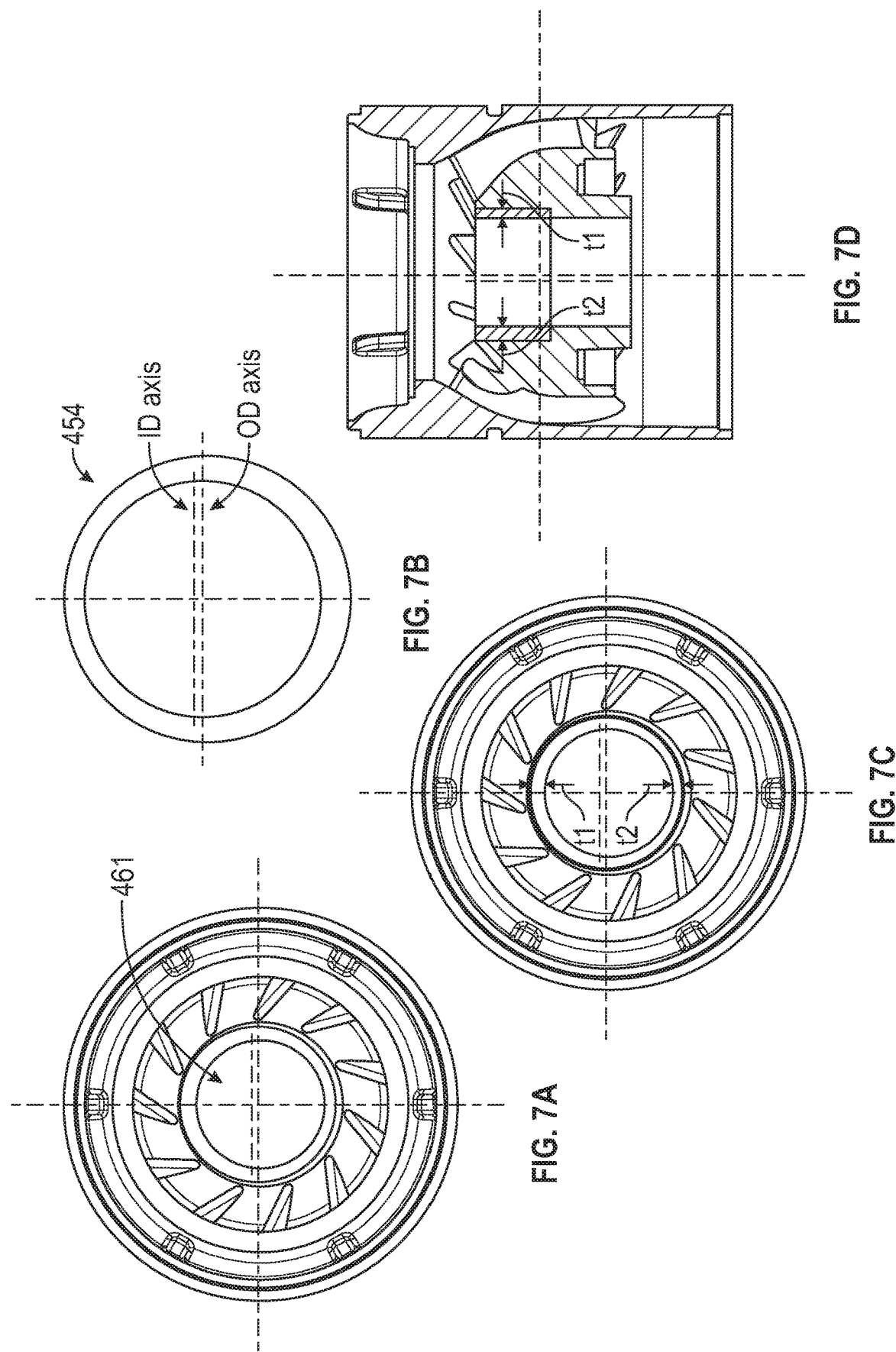

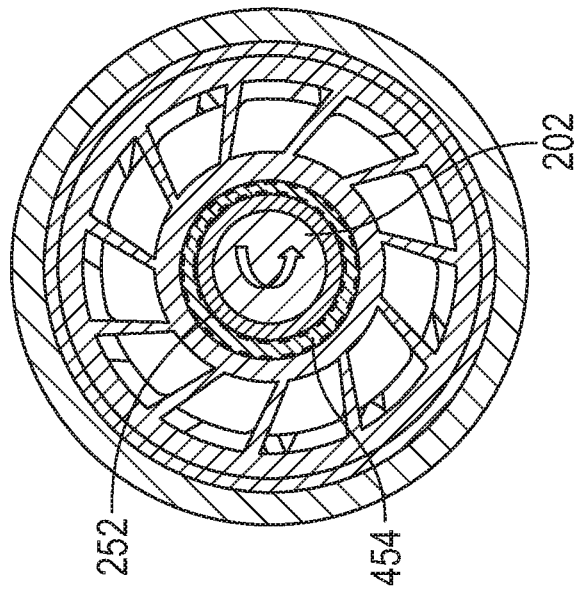
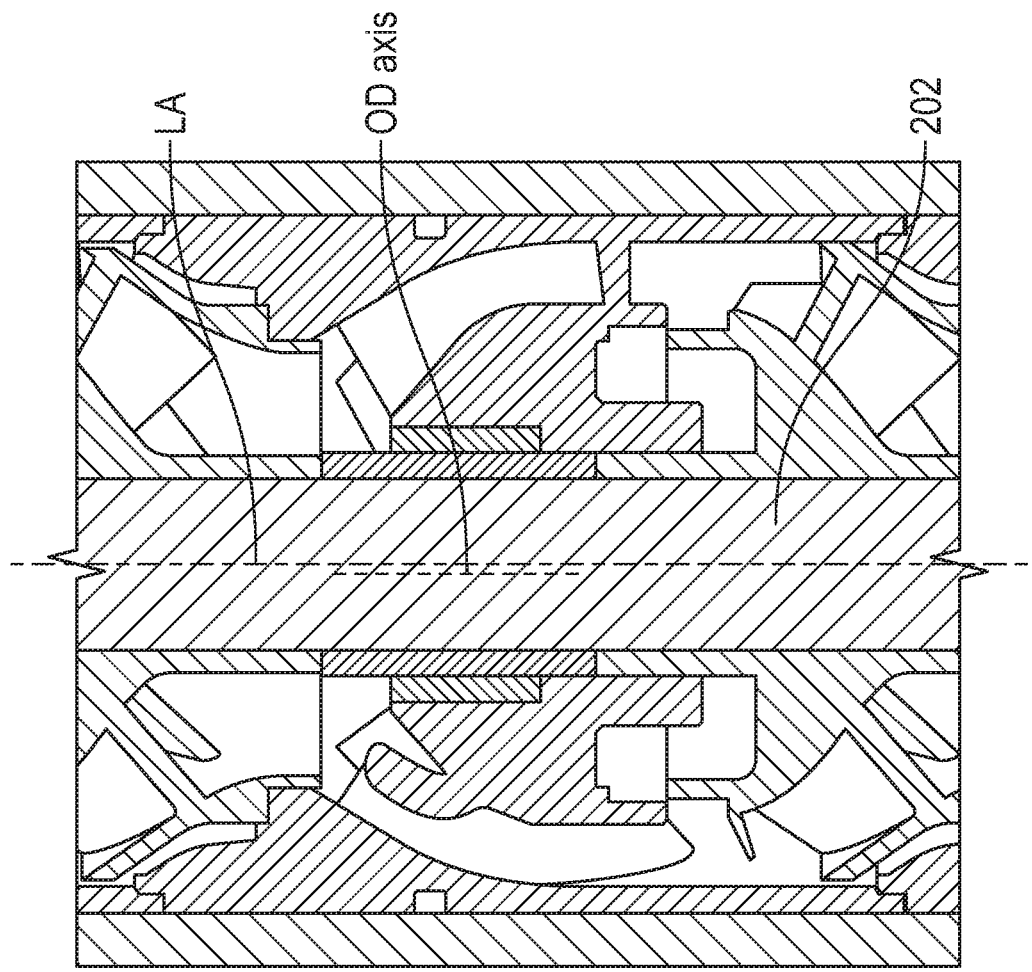
FIG. 8B
FIG. 8A

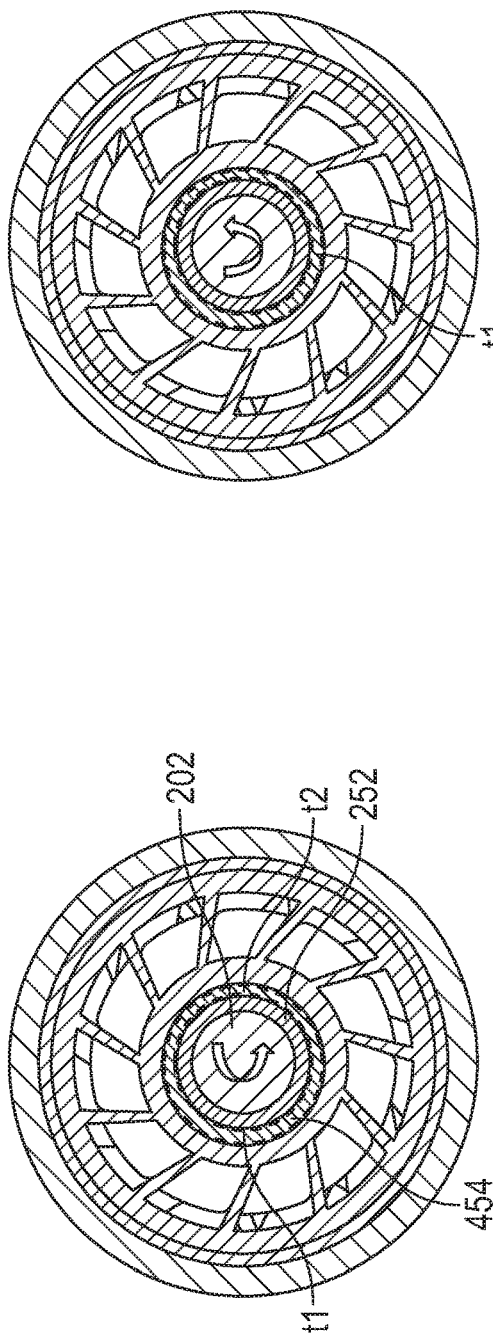
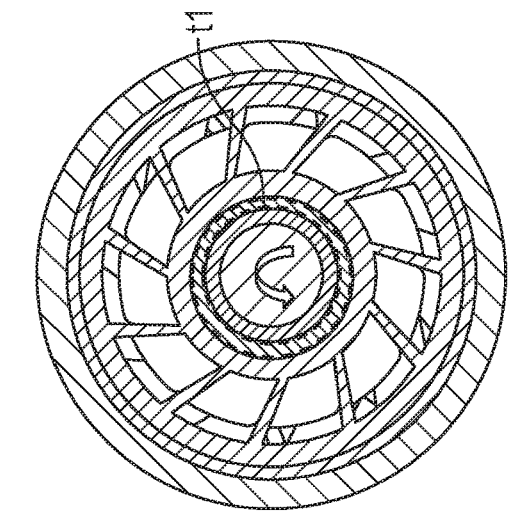
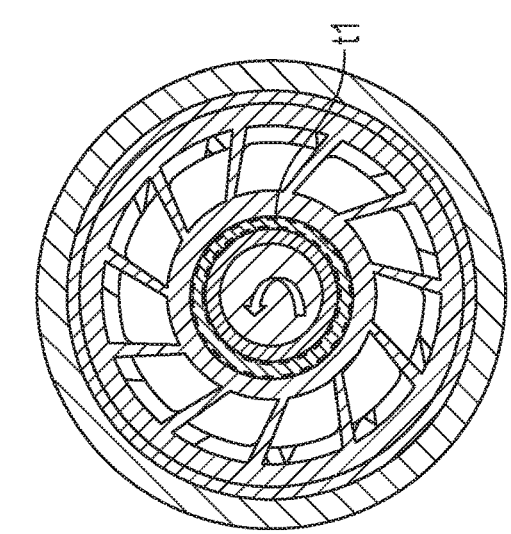
FIG. 9A
FIG. 9B
FIG. 9C
FIG. 9D

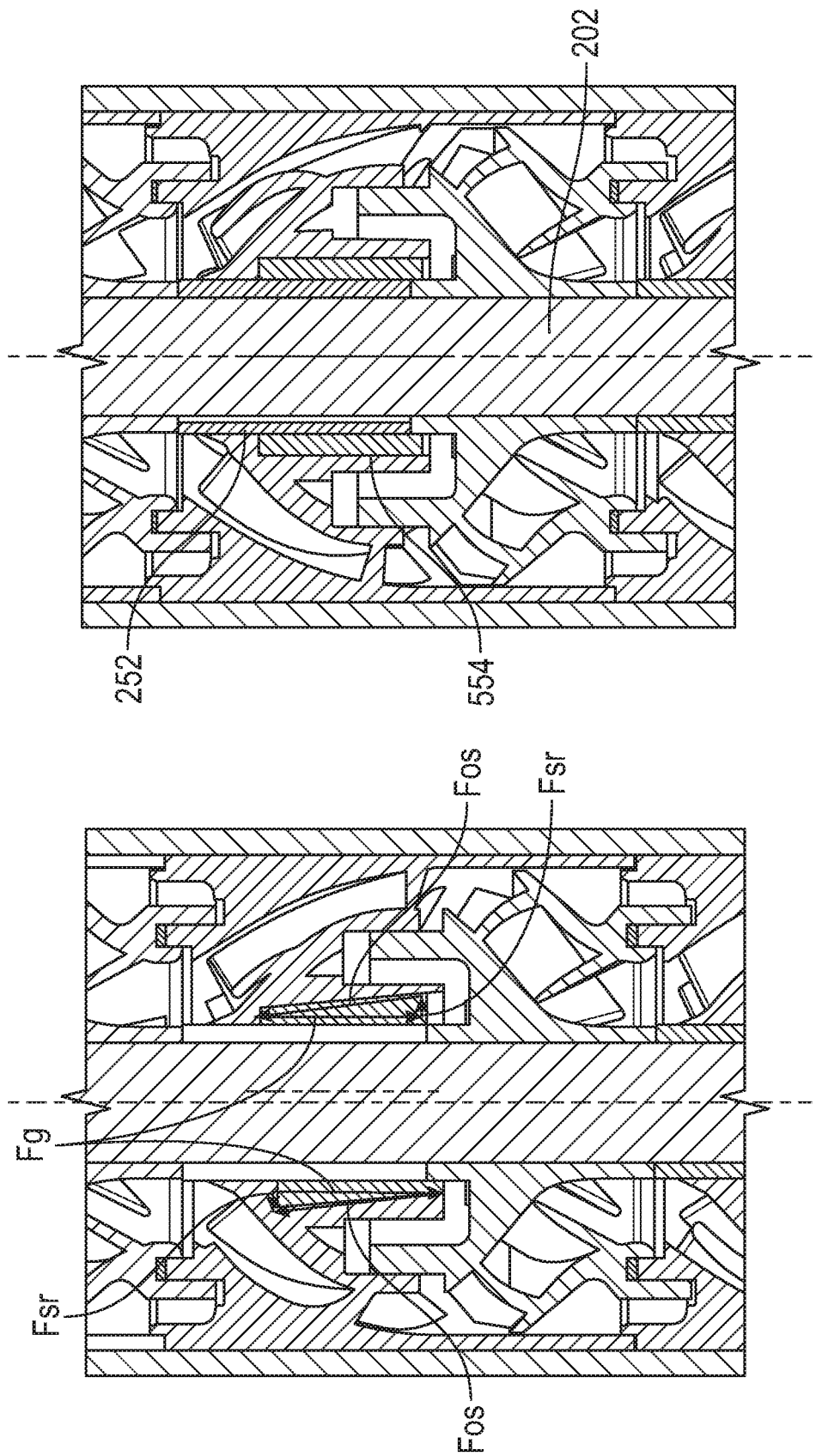

BEARINGS FOR ELECTRIC SUBMERSIBLE PUMPS

CROSS-REFERENCE TO RELATED APPLICATIONS

Any and all applications for which a foreign or domestic priority claim is identified in the Application Data Sheet as filed with the present application are hereby incorporated by reference under 37 CFR 1.57. The present application is a national stage entry under 35 U.S.C. 371 of International Application No. PCT/US2020/051405, filed Sep. 18, 2020, which claims priority benefit of Singapore application No. SG 10201908720Y, filed Sep. 19, 2019, the entirety of which is incorporated by reference herein and should be considered part of this specification.

BACKGROUND

Field

The present disclosure generally relates to systems and methods for artificial lift in oil and gas wells, and more particularly to bearings for use in electric submersible pumps.

Description of the Related Art

Various types of artificial lift equipment and methods are available, for example, electric submersible pumps (ESPs). An ESP includes multiple centrifugal pump stages mounted in series, each stage including a rotating impeller and a stationary diffuser mounted on a shaft, which is coupled to a motor. In use, the motor rotates the shaft, which in turn rotates the impellers within the diffusers. Well fluid flows into the lowest stage and passes through the first impeller, which centrifuges the fluid radially outward such that the fluid gains energy in the form of velocity. Upon exiting the impeller, the fluid flows into the associated diffuser, where fluid velocity is converted to pressure. As the fluid moves through the pump stages, the fluid incrementally gains pressure until the fluid has sufficient energy to travel to the well surface. A bearing assembly can be disposed between the rotating shaft and the stationary diffuser. The bearing assembly may include a bearing sleeve that rotates with the shaft in use, and a bushing that is configured to remain stationary with the diffuser in use. However, in adverse conditions, torque may be applied to the bushing, and the bushing or bearing assembly could fail.

SUMMARY

In some configurations, a bearing assembly for an electric submersible pump (ESP) includes a bearing sleeve configured to be disposed about a shaft of the ESP and a bushing configured to be disposed about the bearing sleeve. An outer surface of the bushing includes a key configured to engage a corresponding keyway in a central bore of a diffuser of the ESP.

The bearing assembly can further include an axial retaining part disposed at, on, or adjacent an upstream end of the bushing. The axial retaining part can be a retaining ring.

The key can be a projection projecting radially outwardly from the outer surface of the bushing, and the keyway can be recessed from the central bore into a wall surrounding the central bore. The key can be an elongated projection extending along at least a portion of an axial length of the bushing, and the keyway can be an elongated groove extending along at least a portion of an axial length of the central bore.

The key can be a groove or recess in the outer surface of the bushing, and the keyway can be a projection projecting radially inwardly into the central bore from a wall surrounding the central bore.

In some configurations, an electric submersible pump (ESP) includes a plurality of stages, each stage comprising an impeller and a diffuser disposed about a shaft, the diffuser having a central bore through which the shaft extends. At least one of the plurality of stages includes a bearing assembly comprising a bearing sleeve disposed about the shaft and configured to rotate with the shaft in use and a bushing disposed radially between the bearing sleeve and a wall surrounding the central bore of the diffuser. The bearing assembly includes an anti-rotation feature configured to prevent or inhibit rotation of the bushing in operation.

The bearing assembly can further include an axial retaining part disposed at, on, or adjacent an upstream end of the bushing. The axial retaining part can be a retaining ring.

The anti-rotation feature can include an external key projecting radially outwardly from an outer surface of the bushing and a recessed keyway in the wall surrounding the central bore, the keyway configured to receive the key. The keyway can be a groove in the wall extending axially along at least a portion of a length of the wall.

The anti-rotation feature can include a recessed key in an outer surface of the bushing and a keyway projecting radially inwardly from the wall into the central bore. The key can be a groove in the outer surface of the bushing extending axially along at least a portion of a length of the bushing.

The anti-rotation feature can include an eccentric profile of the bushing. The anti-rotation feature can include an oblique profile of the bushing.

In some configurations, an electric submersible pump (ESP) includes a plurality of stages, each stage comprising an impeller and a diffuser disposed about a shaft, at least one diffuser comprising a central bore therethrough and a keyway in a wall surrounding the central bore. At least one of the plurality of stages includes a bearing assembly comprising a bearing sleeve disposed about the shaft and configured to rotate with the shaft in use and a bushing disposed radially between the bearing sleeve and the wall surrounding the central bore of the diffuser. An outer surface of the bushing includes a key configured to engage the keyway when the ESP is assembled.

The key can be a projection projecting radially outwardly from the outer surface of the bushing, and the keyway can be recessed radially outward from the central bore into the wall. The key way can be an elongated groove, and the key can be an elongated projection.

The key can be recessed into the outer surface of the bushing, and the keyway can be a projection projecting radially inward from the wall into the central bore. The key can be an elongated groove, and the keyway can be an elongated projection.

BRIEF DESCRIPTION OF THE FIGURES

Certain embodiments, features, aspects, and advantages of the disclosure will hereafter be described with reference to the accompanying drawings, wherein like reference numerals denote like elements. It should be understood that the accompanying figures illustrate the various implementations described herein and are not meant to limit the scope of various technologies described herein.

FIG. 7A shows an end view of an example embodiment of a diffuser.

FIG. 7B shows an end view of an example embodiment of a bushing

FIG. 7C shows the bushing of FIG. 7B installed in the diffuser of FIG. 7A.

FIG. 7D shows a longitudinal cross-section of the bushing and diffuser assembly of FIG. 7C.

FIG. 8A shows a longitudinal cross-section of a portion of an ESP including the bushing and diffuser of FIGS. 7C-7D.

FIG. 8B shows a transverse cross-sectional view of a portion of the ESP of FIG. 8A.

FIGS. 9A-9D show the assembly of FIG. 8B in various operational positions.

FIG. 11A shows a longitudinal cross-sectional view of a portion of an ESP including the bearing assembly of FIGS. 10C-10D, taken in the X-Z plane.

FIG. 11B shows a longitudinal cross-sectional view of the portion of the ESP of FIG. 11A, taken in the Y-Z plane.

DETAILED DESCRIPTION

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. Commonly, these terms relate to a reference point at the surface from which drilling operations are initiated as being the top point and the total depth being the lowest point, wherein the well (e.g., wellbore, borehole) is vertical, horizontal or slanted relative to the surface.

Figure 1:
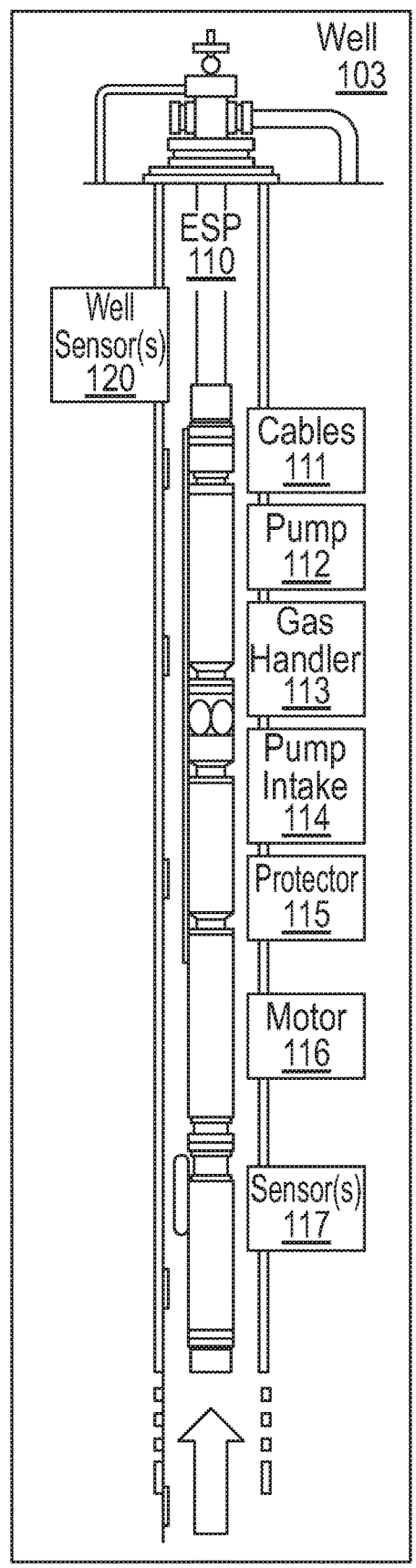
FIG. 1 shows a schematic of an electric submersible pump (ESP) system.

Various types of artificial lift equipment and methods are available, for example, electric submersible pumps (ESP). As shown in the example embodiment of FIG. 1, an ESP 110 typically includes a motor 116, a protector 115, a pump 112, a pump intake 114, and one or more cables 111, which can include an electric power cable. The motor 116 can be powered and controlled by a surface power supply and controller, respectively, via the cables 111. In some configurations, the ESP 110 also includes gas handling features 113 and/or one or more sensors 117 (e.g., for temperature, pressure, current leakage, vibration, etc.). As shown, the well may include one or more well sensors 120.

Figure 2A:
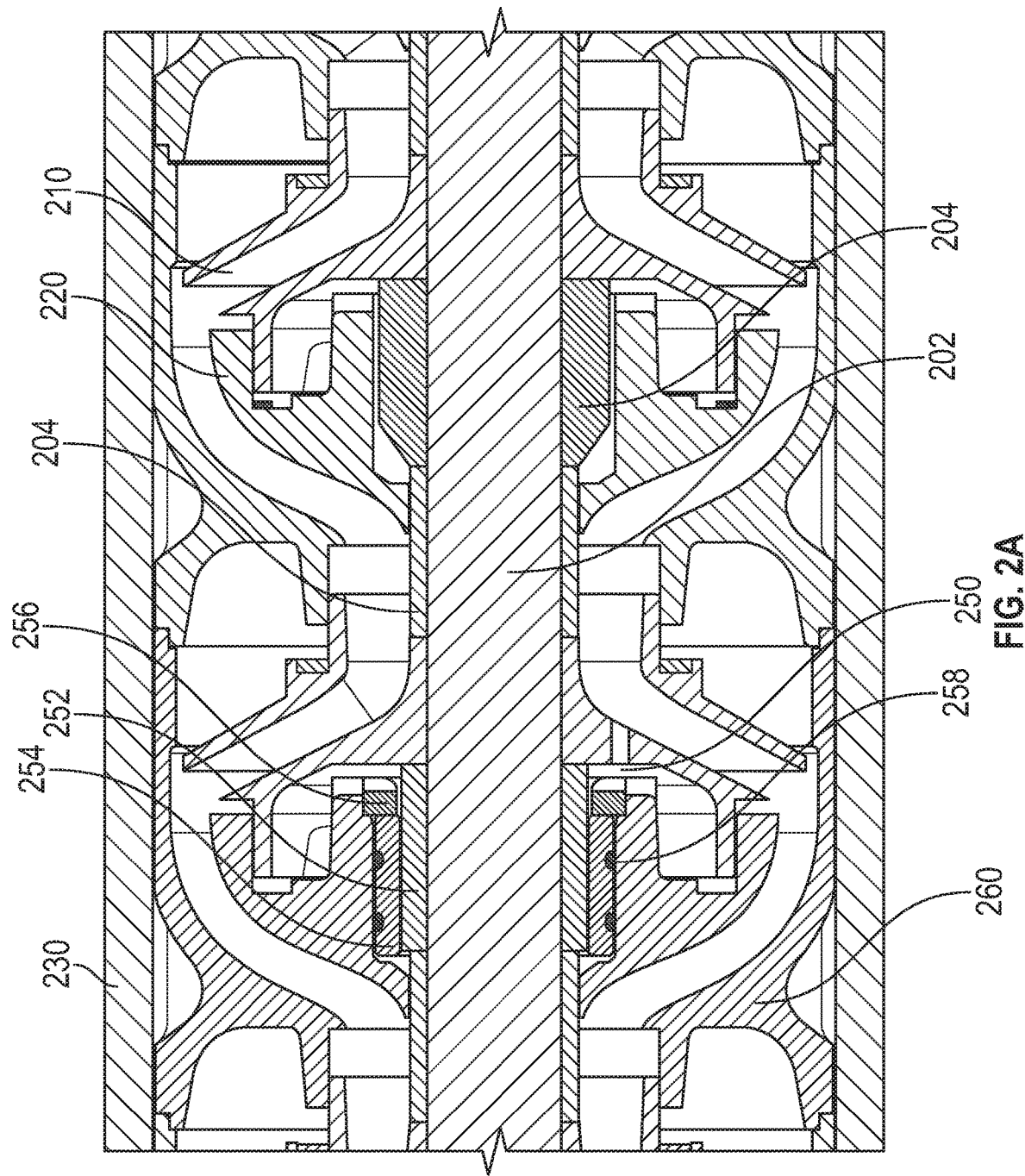
FIG. 2A shows a cross-sectional view of a portion of an ESP.

The pump 112 includes multiple centrifugal pump stages mounted in series within a housing 230, as shown in FIG. 2A. Each stage includes a rotating impeller 210 and a stationary diffuser 220. One or more spacers 204 can be disposed axially between sequential impellers 210. A shaft 202 extends through the pump 112 (e.g., through central hubs or bores or the impellers 210 and diffusers 220) and is operatively coupled to the motor 116. The shaft 202 can be coupled to the protector 115 (e.g., a shaft of the protector), which in turn can be coupled to the motor 116 (e.g., a shaft of the motor). The impellers 210 are rotationally coupled, e.g., keyed, to the shaft 202. The diffusers 220 are coupled, e.g., rotationally fixed, to the housing 230. In use, the motor 116 causes rotation of the shaft 202 (for example, by rotating the protector 115 shaft, which rotates the pump shaft 202), which in turn rotates the impellers 210 relative to and within the stationary diffusers 220.

In use, well fluid flows into the first (lowest) stage of the ESP 110 and passes through an impeller 210, which centrifuges the fluid radially outward such that the fluid gains energy in the form of velocity. Upon exiting the impeller 210, the fluid makes a sharp turn to enter a diffuser 220, where the fluid's velocity is converted to pressure. The fluid then enters the next impeller 210 and diffuser 220 stage to repeat the process. As the fluid passes through the pump stages, the fluid incrementally gains pressure until the fluid has sufficient energy to travel to the well surface.

As shown in FIG. 2A, a bearing assembly 250 can be disposed between, e.g., at least partially radially between, the shaft 202 and a diffuser 220 and/or between, e.g., at least partially axially between, an impeller 210 and its associated diffuser 220. A portion of the diffuser 220 can act as a bearing housing 260. In the illustrated embodiment, the bearing assembly 250 includes a bearing sleeve 252 disposed about the shaft 202 and a bushing 254 disposed about the bearing sleeve 252 and radially between the bearing sleeve 252 and a portion of the diffuser 220. One or more o-rings 258 can be disposed about the bushing 254, for example, radially between the bushing 254 and the diffuser 220 or bearing housing 260.

Figure 2B:
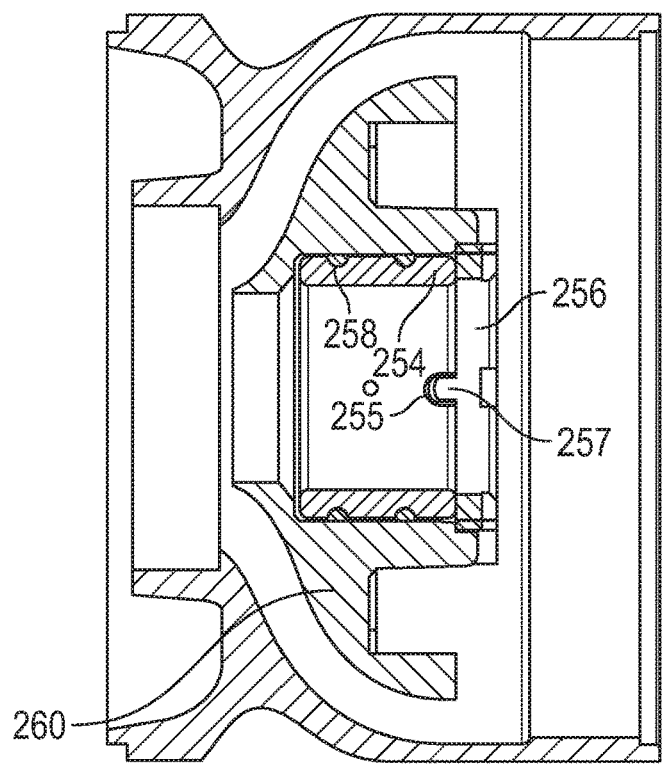
FIG. 2B shows a cross-sectional view of a portion of a bearing assembly.

The illustrated bearing assembly 250 also includes an anti-rotation upthrust ring 256 disposed about the bearing sleeve 252. As shown, the anti-rotation upthrust ring 256 can be disposed adjacent an upstream end of the bushing 254. The bearing sleeve 252 is keyed or rotationally coupled to the shaft 202 such that the bearing sleeve 252 rotates with the shaft in use 202. The anti-rotation upthrust ring 256 prevents or inhibits the bushing 254 from rotating such that the bushing 254 is stationary or rotationally fixed relative to the diffuser 220. As shown in the view of FIG. 2B, the bushing 254 can include a notch 255 extending downstream from the upstream end or edge of the bushing 254. The illustrated anti-rotation upthrust ring 256 includes a stopper or lug 257 projecting downstream from a downstream end or edge of the anti-rotation upthrust ring 256. The lug 257 is received in the notch 255 to key the bushing 254 to the anti-rotation upthrust ring 256 such that the anti-rotation upthrust ring 256 can prevent or inhibit the bushing 254 from rotating. The anti-rotation upthrust ring 256 can also help prevent or inhibit axial movement of the bushing 254 and/or the bushing 254 from dropping out of place from the bearing housing 260. In use, the bearing assembly 250 can help absorb thrust and/or accommodate the rotation of the shaft relative to the diffuser.

Figure 2C:
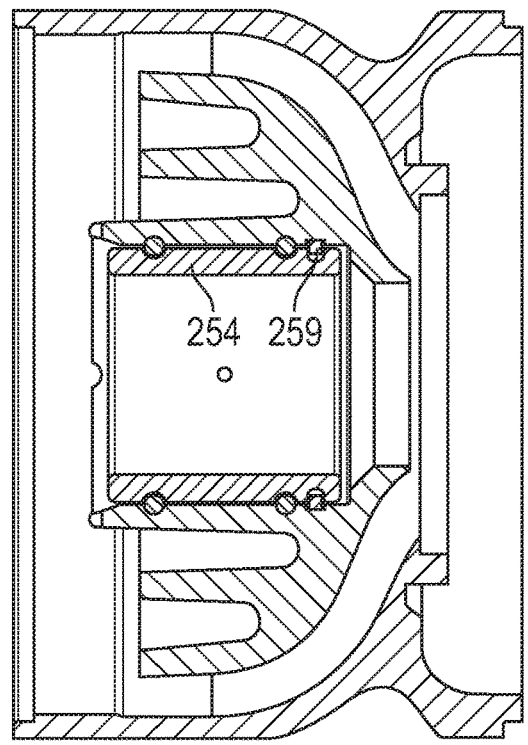
FIG. 2C shows a cross-sectional view of a portion of an alternative bearing assembly.

FIG. 2C illustrates an alternative bearing assembly 250 including a retaining ring 259 instead of the anti-rotation upthrust ring 256. The retaining ring 259 can be at least partially disposed in a groove in the outer diameter or surface of the bushing 254 and at least partially disposed in a groove in the bearing housing 260. The retaining ring 259 restricts axial movement of the bushing 254 relative to the bearing housing 260. However, the retaining ring 259 may not prevent or inhibit rotational movement of the bushing 254 and the bearing 254 may crack at the retaining ring groove.

Some existing bearing assemblies are abrasion resistant zirconia (ARZ) complaint mount bearings, for example as shown in FIGS. 2A-2B. However, the anti-rotation mechanism of such bearing assemblies, e.g., the anti-rotation upthrust ring 256, is sometimes inadequate, for example, in unconventional wells and/or wells with extreme sand concentrations. In such cases, a large amount of torque transmitted from the shaft 202 and bearing sleeve 252 to the bushing 254 can cause the bushing 254 to spin. ARZ complaint bearings can exhibit various failures, for example, the notch 255 shearing off the lug 257, the bushing 254 cracking, spinning of the upthrust ring 256, and/or the upthrust ring 256 and/or bushing 254 falling out of the bearing housing 260. In some cases, the o-rings 258 can be damaged, fail, and/or drop out. In such cases, the bushing 254 may not be held in place properly and/or may be able to spin.

Figure 3:
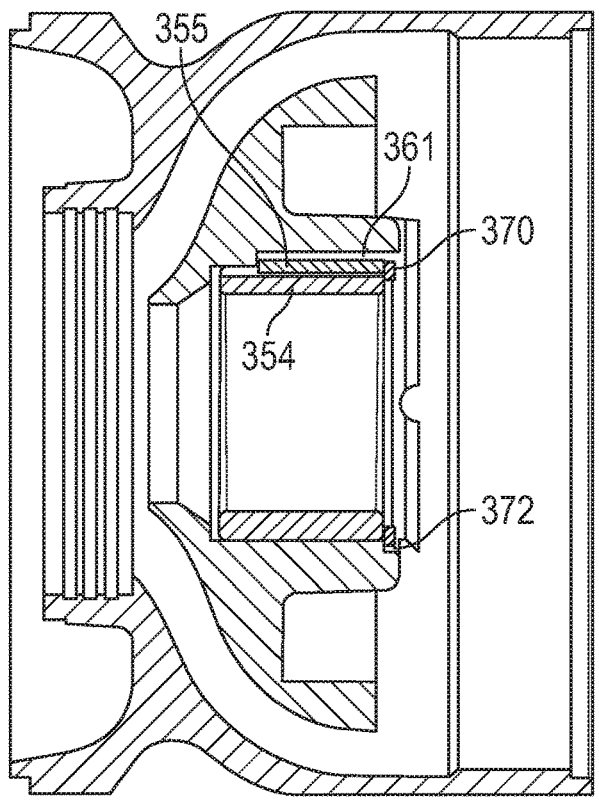
FIG. 3 shows a cross-sectional view of a portion of an embodiment of a bearing assembly according to the present disclosure.

In some configurations, bearing assemblies according to the present disclosure can include a keyed bushing 354 that acts as an anti-rotation mechanism to advantageously prevent or inhibit the bushing from spinning, while also minimizing stress concentrations. The bushing 354 is held in place within the bearing housing 260. As shown in FIG. 3, the bushing 354 includes an external key or pin 355. In the configuration illustrated in FIG. 3, the key 355 is an elongated protrusion extending radially outwardly from an outer diameter or surface of the bushing 354 and extending axially along at least a portion of an axial length of the bushing 354. The key 355 can have a rounded, squared, or other shape. The key 355 can be made of a higher strength material (compared to, for example, existing ARZ bearings), for example, stainless steel, Inconel, or Monel. The bearing housing 260, for example, a radially inner surface of the bearing housing 260, can include a corresponding groove or keyway 361 as shown. When the bushing 354 is installed in the bearing housing 260, the key 355 is received in the keyway 361 to rotationally secure the bushing 354 to the bearing housing 260. The key 355 can advantageously tolerate higher torque compared to, for example, anti-rotation upthrust ring 256.

To assemble the bearing assembly, the bushing 354, including the key 355, is installed in the bearing housing 260. Installing the bushing 354 in the bearing housing 260 can include inserting the key 355 into the keyway 361. The bushing 354 can be installed in the bearing housing 260, and/or the key 355 can be installed in the keyway 361, via clearance fit, transition fit, interference fit, and/or any other suitable engineering fit or other means, selected based on, for example, the material of the bushing 354 and/or key 355.

Figure 4:
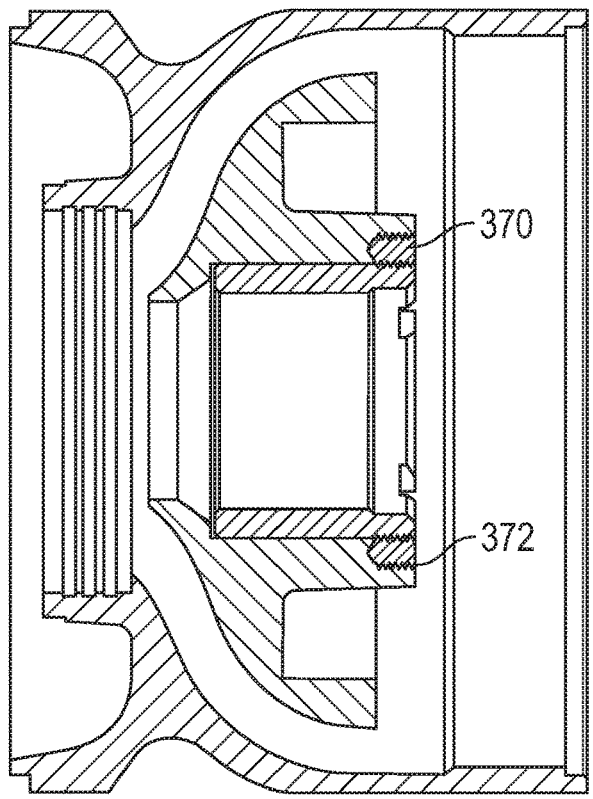
FIG. 4 shows a cross-sectional view of a portion of an embodiment of a bearing assembly according to the present disclosure.

Once the bushing 354 is installed in the bearing housing 260, a retaining part 370, for example, an axial retaining part, can be installed in the bearing housing 260. As shown in, for example, FIGS. 3-4, the retaining part 370 can be disposed at, on, or adjacent a lower or upstream end of the bushing 354. The retaining part 370 can be at least partially disposed in a recess 372 formed in the bearing housing 360, for example, the radially inner surface of the bearing housing 360. The recess 372 can extend partially or fully around the circumference of the bearing housing 260. In the embodiment of FIG. 3, the retaining part 370 is a retaining ring. The retaining part 370 can be, for example, a press-fit lock ring, a snap ring, or a threaded ring. In some configurations, the retaining part 370 is a spiral ring, constant section ring, single turn ring, nested wave spring, or retaining ring having an axial waveform. FIG. 4 illustrates an embodiment in which the retaining part 370 is a threaded ring, which can be threaded onto or about an externally threaded portion of the bushing 354 disposed at, proximate, or adjacent the upstream end of the bushing 354. The retaining part 370 is installed at, adjacent, or proximate the upstream end of the bushing 354 and/or key 355. The retaining part 370 helps axially retain the bushing 354 and/or key 355 and prevent or inhibit the bushing 354 and/or key 355 from dropping out of place.

Figure 5C:
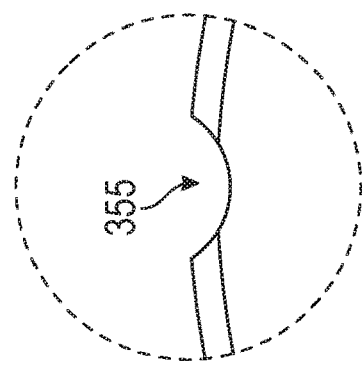
FIG. 5C shows a portion of the bushing of FIG. 5A.
Figure 5B:
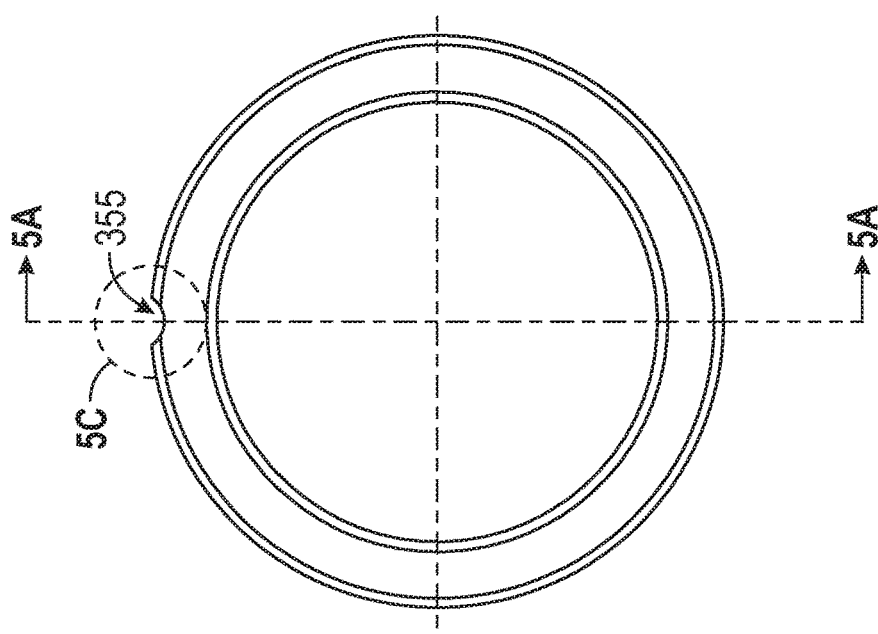
FIG. 5B shows a top view of the bushing of FIG. 5A.
Figure 5A:
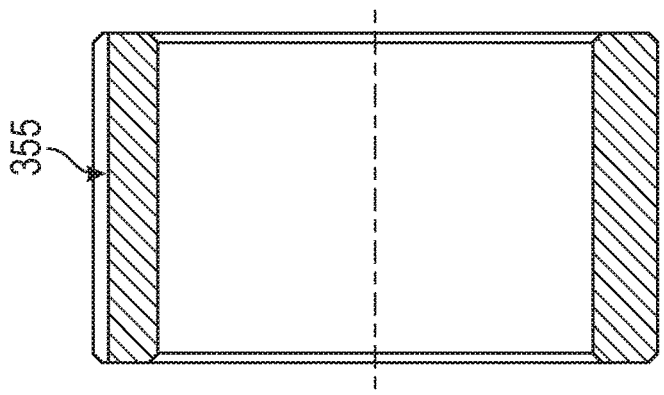
FIG. 5A shows a cross-sectional view of an embodiment of a bushing according to the present disclosure.

In some configurations, for example as shown in FIGS. 5A-5C, the key 355 is a recess or groove in the outer diameter or surface of the bushing 354. The recess or groove can have a rounded profile. The recess or groove can be symmetric or axisymmetric, for example as shown in FIGS. 5A-5C. When the bushing 354 is installed in the bearing housing 260, the recess or groove receives a corresponding protrusion extending inwardly (towards the central bore that receives the bushing 354) from the bearing housing 260. The recess or groove can allow for customization of the wall thickness of the bushing 354, which can allow for balancing of cost and required strength.

Figure 6A:
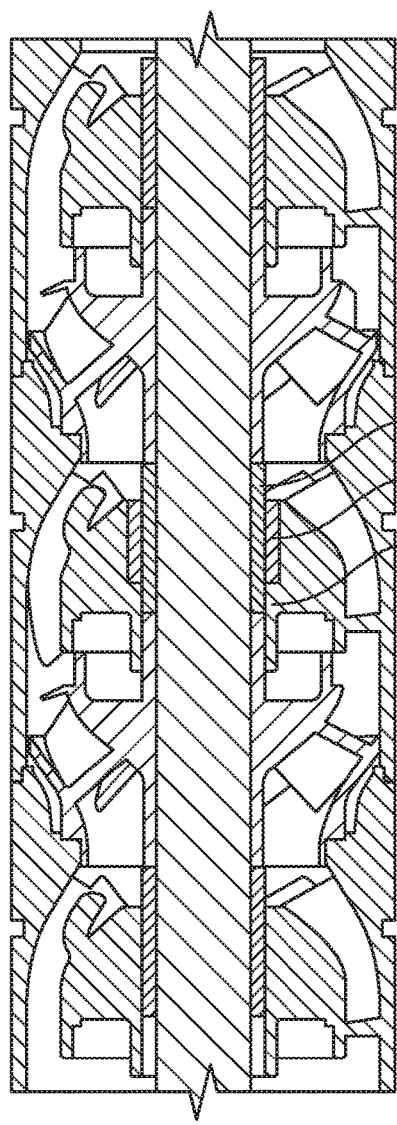
FIG. 6A shows a longitudinal cross-sectional view of a portion of an ESP.
Figure 6B:
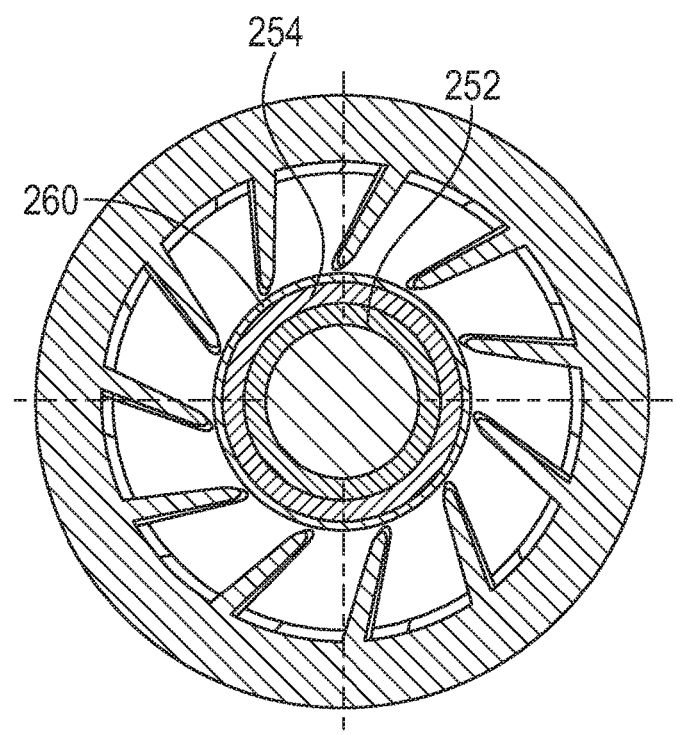
FIG. 6B shows a transverse cross-sectional view of a portion of the ESP of FIG. 6A.

In some configurations, bearing assemblies according to the present disclosure include a bushing 454 having an eccentric profile or offset installed in a bearing housing having a bore 461 with a corresponding eccentric profile (or being designed to accommodate the eccentric bushing 454), for example as shown in FIGS. 7A-7D. In the illustrated configuration, the bushing 454 is disposed in a recessed portion of the bearing housing 260 surrounding the central bore 461 (for example, a portion of the bearing housing 260 recessed radially outwardly and into the bearing housing 260 from the central bore 461, such that the central bore 461 has a greater diameter in the recessed portion of the bearing housing 260 than the diameter of the central bore 461 in a portion of the bearing housing 260 axially separated from the bushing 454). The eccentric profile acts as an anti-rotation mechanism to advantageously prevent or inhibit the bushing from spinning. In conventional bearing assemblies, for example as shown in FIGS. 6A-6B, the bearing sleeve 252 and bushing 254 are concentric (the inner and outer diameters of each are concentric), have uniform radial thicknesses, and their longitudinal axes are aligned. In the illustrated configuration, the bushing 254 is press-fit into the bearing housing 260, and an interference fit prevents or inhibits the bushing 254 from spinning. However, the interference fit can fail, for example at certain temperatures (e.g., around 300° F.) due to the bushing 254 and bearing housing 260 being different materials having different coefficients of thermal expansion.

In the eccentric bearing assembly of FIG. 7A-7D, the central longitudinal axes LA (based on the inner diameters or surfaces) of the bushing 454 and bearing housing bore 461 still align with the shaft 202 axis and axis of rotation, as also shown in FIGS. 8A-8B. However, the outer diameter or circumference of the bushing 454 (and outer diameter or circumference of a portion of the bearing housing 260 surrounding the bore 461 and configured to receive the bushing 454) is eccentric. In other words, as shown in, for example, FIGS. 7B-7D, the thickness (radial thickness) of the bushing 454 is not equal about the circumference of the bushing 454. In the illustrated configuration, the thickness or depth (radial depth) of the recess in the bearing housing 260 that receives the bushing 454 is also not equal about the circumference of the bearing housing bore 461 and corresponds to (e.g., substantially matches) the thickness of the bushing 454. In the illustrated configuration, a portion of the bushing 454 having the greatest thickness t1 is diametrically opposed from a portion of the bushing 454 having the smallest thickness t2. The thickness of the bushing 454 can increase in both directions around the circumference of the bushing 454 from the thinnest portion to the thickest portion. In some configurations, the difference between t1 and t2 can be in the range of about 0.025" to about 0.100". A central longitudinal axis of or based on the outer diameter or circumference of the bushing 454 is therefore offset from the central longitudinal axis of or based on the inner diameter. The eccentric bushing 454 can be installed in the bearing housing 260 in an orientation to avoid the bushing 454 dropping out of the bearing housing 260. For example, as shown in FIG. 7D, when the bushing 454 is received in the recessed portion of the bearing housing 260, the bushing 454 can sit on a ledge or lip formed by the bearing housing 260, which can prevent or inhibit the bushing 454 from dropped out. Additionally or alternatively, adhesive can be applied between the bushing 454 and bearing housing 260 to secure the bushing 454.

The eccentricity of the bushing 454, and portion of the bearing housing 260 that receives the bushing 454, restrains the bushing 454 from spinning. In normal operation, the shaft 202 and bearing sleeve 252 rotate or spin freely about their longitudinal axis, and the eccentric bushing 454 remains stationary or substantially stationary at a 0° rotation, as shown in FIG. 9A. If the bearing sleeve 252 becomes sand jammed (in other words, sand becomes stuck in the running clearance between the bearing sleeve 252 and the bushing 454), torque can be transmitted to the bushing 454 and start to rotate the bushing 454, as shown in FIG. 9B, in which the thickest portion t1 has rotated about 90°. An anti-rotation frictional force will be generated in the area of the thickest portion t1 due to the thicker area of the eccentric bushing 454 attempting to rotate into a thinner area of the bearing housing 260. As the bushing 454 attempts to continue rotating, toward about 180° as shown in FIG. 9C, the anti-rotation frictional force increases. As torque increases and is eventually transmitted to the bearing housing 260, the bearing housing 260 exhibits a restraining reaction torque to prevent or inhibit further rotation of the bushing 454 and bearing housing 260, for example as shown in FIG. 9D, in which the shaft 202 has continued rotation to about 270° but the bushing 454 has been stopped.

In some configurations, bearing assemblies according to the present disclosure include a bushing 554 having an oblique profile installed in a bearing housing having a bore 561 with a corresponding oblique profile (or being designed to accommodate the oblique bushing 554), for example as shown in FIGS. 10A-10D.

Figure 10A:
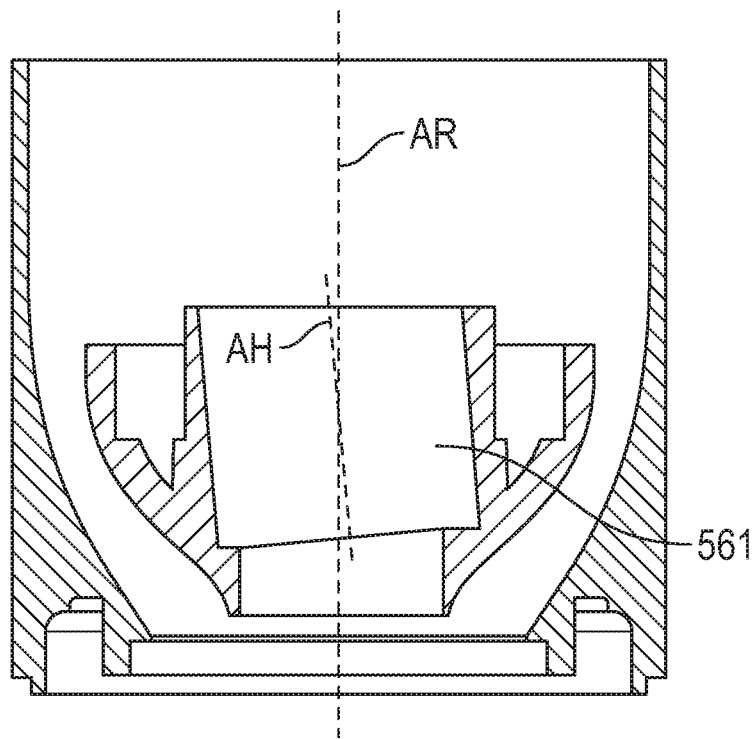
FIG. 10A shows a cross-sectional view of an example embodiment of a bearing housing.
Figure 10B:
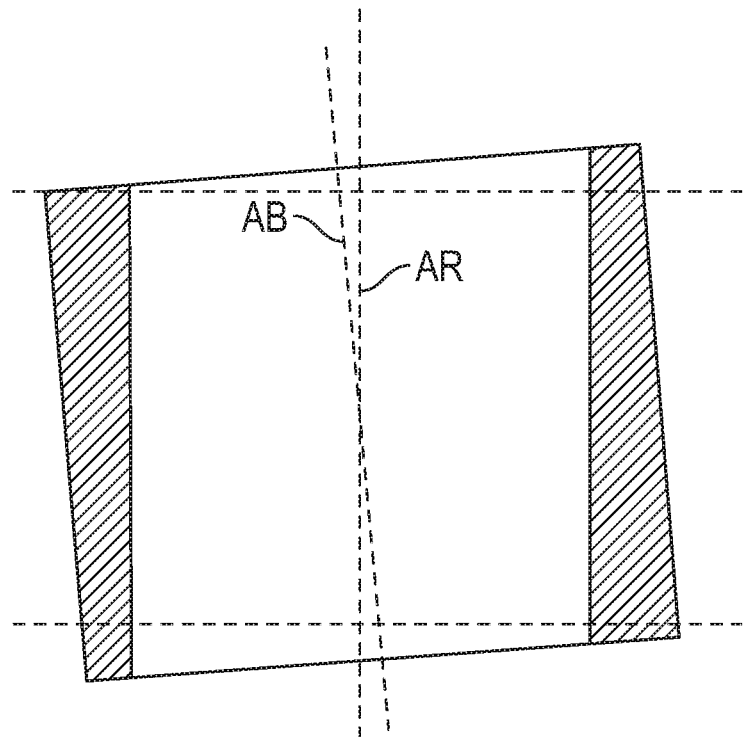
FIG. 10B shows a cross-sectional view of an example embodiment of a bushing.

In the oblique bearing assembly of FIG. 10A-10D, the longitudinal axis AH of the bearing housing bore 561 is oblique relative to (or is non-parallel to and/or intersects) the shaft 202 axis of rotation AR, as shown in FIG. 10A. In other words, the wall surrounding the bore 561 is angled relative to the shaft 202 axis and axis of rotation AR. In some configurations, the longitudinal axis AH of the bearing housing bore 561 extends at an angle in the range of >0° to about 15°, or greater than 15°, relative to the shaft axis of rotation AR. The central longitudinal axis of the bushing 554, based on the inner diameter or surface of the bushing 554, aligns with the shaft 202 axis and axis of rotation AR, as shown in FIG. 10B. However, the longitudinal axis AB of the bushing 554 based on the outer diameter or surface of the bushing 554 is oblique relative to (or is non-parallel to and/or intersects) the shaft 202 axis of rotation AR. In some configurations, the longitudinal axis AB of the bushing 554 based on the outer diameter or surface of the bushing 554 extends at an angle in the range of >0° to about 15°, or greater than 15°, relative to the shaft axis of rotation AR, for example, to correspond to (e.g., match) the angle of the bore 561 axis AH relative to the shaft axis of rotation AR.

Figure 10C:
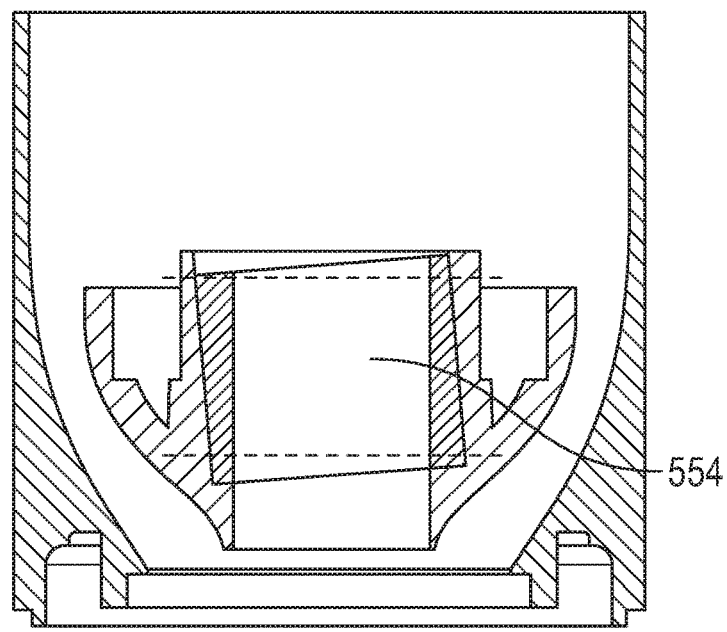
FIG. 10C shows the bushing of FIG. 10B installed in the bearing housing of FIG. 10A.
Figure 10D:
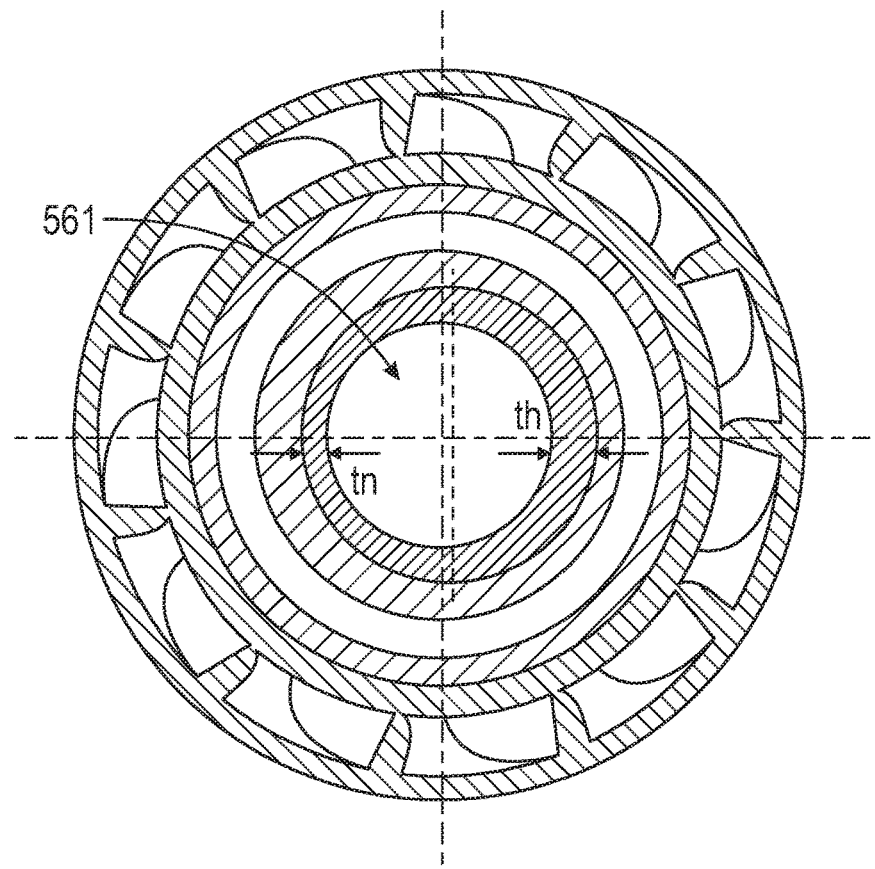
FIG. 10D shows a transverse cross-sectional view of the assembly of FIG. 10C.

In other words, the thickness (radial thickness) of the bushing 554 is not equal about the circumference of the bushing 554. As shown in the transverse cross-section of FIG. 10D, one side (lateral side) of the bearing assembly has a thinner bushing 554 radial thickness to and a thicker (radially thicker or wider) bearing housing bore 561 compared to the opposite side (lateral side), which has a thicker bushing 554 radial thickness th and a thinner (radially thinner or narrower) bearing housing bore 561. Additionally, when viewing a longitudinal cross-section as shown in FIG. 10B, the thickness of each lateral side of the bushing 554 is not equal or even along the longitudinal length of the bushing 554. In other words, the outer surface of the bushing 554 is tapered and/or angled. Ends (top and bottom ends or edges) of the bushing 554 can be angled relative to a plane perpendicular to the shaft rotation axis AR as shown in FIGS. 10B and 10C. In other configurations, the top and/or bottom ends or edges of the bushing 554 can be trimmed to be perpendicular to the shaft axis, as indicated by the dashed horizontal lines in FIGS. 10B and 10C.

In the oblique bearing assembly of FIGS. 10A-10C, the center of moment of inertia of the bushing 554 and bearing housing is located at the intersection of the shaft axis of rotation AR and the oblique axis AB of the bushing 554. In a case of, for example, sand jam, if torque is transmitted to the bearing 554, the bearing 554 and/or bushing housing are restrained from spinning due to the oblique profile.

The oblique profile acts as an anti-rotation mechanism to advantageously prevent or inhibit the bushing from spinning. The oblique profile can also prevent or inhibit the bushing 554 from dislodging and/or dropping out of the bearing housing. The oblique profile bushing 554 has a concentric axis with the shaft 202 rotation axis in one plane (e.g., Y-Z, as shown in FIG. 11B), but not in another plane (e.g., X-Z, as shown in FIG. 11A). When assembled and in use, a gravity force Fg, shown in FIG. 11A, may act on the bushing 554 and could cause the bushing 554 to drop out. However, a side reaction force Fsr, due to contact between the bearing sleeve 252 and the bushing 554, and a friction force Fos on the oblique surface of the bushing 554, due to contact between the outer surface of the bushing 554 and the inner diameter or surface of the bearing housing bore 561, will also act on the bushing 554, counteracting the gravity force Fg and causing a wedging effect to prevent or inhibit the bushing 554 from dropping out of place. In conditions, such as sand jam, in which torque is transferred to the bearing 554, the off-set, oblique, or eccentric bearing axis AB relative to the shaft axis of rotation AR will cause an anti-rotation force or torque to be generated as thicker portion(s) of the bushing 554 attempt to rotate into thinner area(s) of the bearing housing or bearing housing bore 561. If the torque is eventually transmitted to the bearing housing, the oblique profile bearing housing bore will cause the bearing housing to exhibit a restraining, or anti-torque force to prevent or inhibit the bearing housing and/or bushing 554 from spinning. Similar to the eccentric profile bushing 454, the oblique profile bushing 554 can advantageously help prevent or inhibit the bushing 454, 554 from spinning and/or dropping out of the bearing housing, while also only requiring two parts (i.e., the bushing 454, 554 and the bearing housing) instead of a compliant bearing system, which requires a third part in the form of a retaining ring or anti-rotation upthrust ring.

Figure 12A:
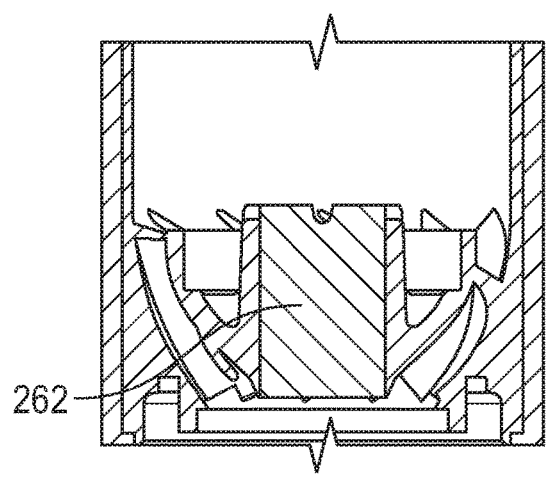
FIG. 12A shows a longitudinal cross-sectional view of an example embodiment of a bearing housing having a coated bore inner diameter.
Figure 12B:
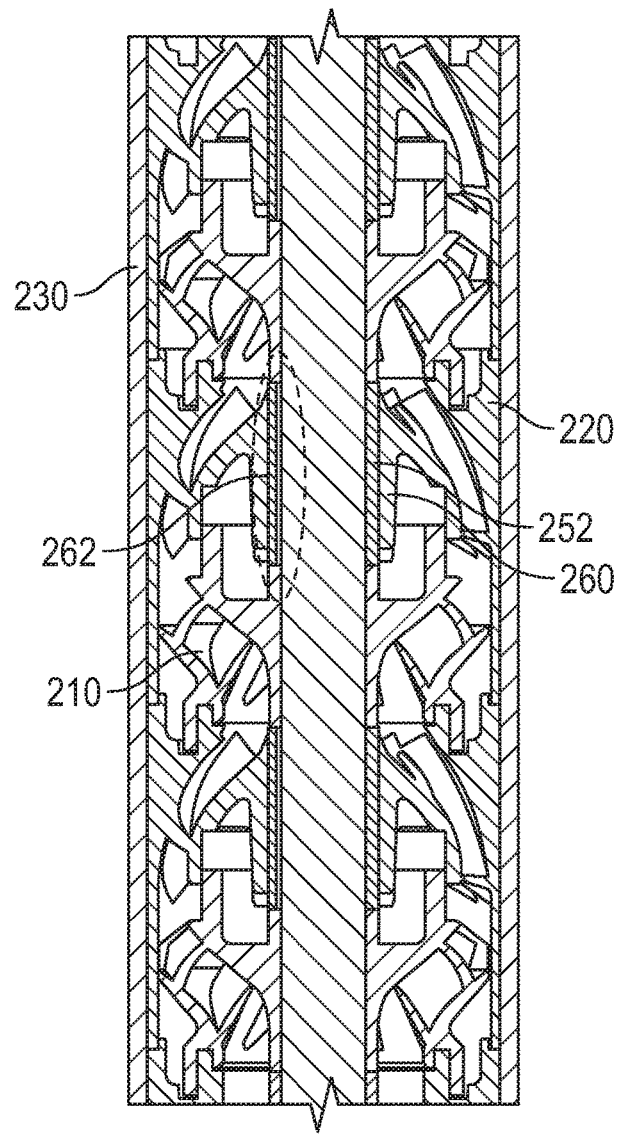
FIG. 12B shows a longitudinal cross-sectional view of a portion of an ESP including the bearing housing of FIG. 12A.

In some existing bearing assemblies, one or more components are made of tungsten carbide, which has a higher hardness compared to, for example, ceramic, to increase wear resistance, for example, to sand. In some configurations according to the present disclosure, the inner diameter or surface of the bearing housing bore is hard coated or includes a hard surface coating 262, for example as shown in FIGS. 12A-12B. In some configurations, the coating 262 is or includes tungsten carbide and/or a diamond-like carbon (DLC) coating. The bearing sleeve 252 and/or bushing (e.g., bushing 254, 354, 454, 554) can be made of or include, for example, tungsten carbide or ceramic. In some configurations, a pump including a diffuser 220 having coating 262 on the bearing housing bore does not require a bushing, or other components such as a retaining ring or anti-rotation upthrust ring. For example, in the configuration of FIG. 12B, the bearing assembly includes only the bearing sleeve 252 disposed in the bearing housing bore, which is coated with coating 262. The coating 262 can have a thickness selected to last for the expected run life of the ESP. In some configurations, the coating 262 is less than about 0.1" thick. The coating 262 can have a surface roughness selected to help improve run life.

The coating 262 can be applied via various technologies or processes, depending on for example, the material type, hardness, and/or property requirements. For example, the coating 262 can be applied via industrial HVAF, high velocity oxygen fuel (HVOF), plasma spraying, thermal spraying, physical vapor deposition processes such as electron beam physical vapor deposition (EBPVD), ion plating, ion beam assisted deposition (MAD), magnetron sputtering, pulsed laser deposition, sputter deposition, vacuum deposition, vacuum evaporation, evaporation (deposition), and/or any other suitable process.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and/or within less than 0.01% of the stated amount. As another example, in certain embodiments, the terms "generally parallel" and "substantially parallel" or "generally perpendicular" and "substantially perpendicular" refer to a value, amount, or characteristic that departs from exactly parallel or perpendicular, respectively, by less than or equal to 15 degrees, 10 degrees, 5 degrees, 3 degrees, 1 degree, or 0.1 degree.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. It is also contemplated that various combinations or sub-combinations of the specific features and aspects of the embodiments described may be made and still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above.

What is claimed is:

1. A bearing assembly for an electric submersible pump (ESP), the bearing assembly comprising:
   a bearing sleeve configured to be disposed about a shaft of the ESP;
   a bushing configured to be disposed about the bearing sleeve, an outer surface of the bushing comprising a key, the key configured to engage a corresponding keyway in a diffuser of the ESP; and
   a retaining ring engaged with the key.

2. The bearing assembly of claim 1, wherein the key is a projection projecting radially outwardly from the outer surface of the bushing.

3. The bearing assembly of claim 2, wherein the key is an elongated projection extending along at least a portion of an axial length of the bushing, and the keyway to be engaged is an elongated groove extending along at least a portion of an axial length of a wall of the diffuser surrounding a central bore of the diffuser.

4. The bearing assembly of claim 1, wherein the retaining ring is at least one of a press-fit lock ring, a snap ring, or a threaded ring.

5. The bearing assembly of claim 1, wherein the retaining ring is at least one of a spiral ring, a constant section ring, a single turn ring, or a nested wave spring.

6. An electric submersible pump (ESP) comprising:
a plurality of stages, each stage comprising an impeller and a diffuser disposed about a shaft, the diffuser having a central bore through which the shaft extends;
at least one of the plurality of stages comprising a bearing assembly comprising:
a bearing sleeve disposed about the shaft and configured to rotate with the shaft in use;
a bushing disposed radially between the bearing sleeve and a wall surrounding the central bore of the diffuser;
a key coupled to the bushing, the key configured to prevent or inhibit rotation of the bushing in operation; and
a retaining ring engaged with the key.

7. The ESP of claim 6, wherein the key comprises a projection projecting radially outwardly from an outer surface of the bushing, the bearing assembly further comprising a recessed keyway in the wall surrounding the central bore, the recessed keyway configured to receive the key.

8. The ESP of claim 7, wherein the recessed keyway is a groove in the wall extending axially along at least a portion of a length of the wall.

9. The ESP of claim 6, the bearing assembly further comprising a keyway in an outer surface of the bushing, and wherein the key projects radially inward from the wall into the central bore, the keyway configured to receive the key.

10. The ESP of claim 9, wherein the keyway is a groove in the outer surface of the bushing extending axially along at least a portion of a length of the bushing.

11. The ESP of claim 6, wherein the retaining ring is at least one of a press-fit lock ring, a snap ring, or a threaded ring.

12. The ESP of claim 6, wherein the retaining ring is at least one of a spiral ring, a constant section ring, a single turn ring, or a nested wave spring.

13. An electric submersible pump (ESP) comprising:
a plurality of stages, each stage comprising an impeller and a diffuser disposed about a shaft, at least one diffuser comprising a central bore therethrough and a keyway in a wall surrounding the central bore;
at least one of the plurality of stages comprising a bearing assembly comprising:
a bearing sleeve disposed about the shaft and configured to rotate with the shaft in use;
a bushing disposed radially between the bearing sleeve and the wall surrounding the central bore of the at least one diffuser, an outer surface of the bushing comprising a key configured to engage the keyway of the at least one diffuser when the ESP is assembled; and
a retaining ring engaged with the key.

14. The ESP of claim 13, wherein the key is a projection projecting radially outwardly from the outer surface of the bushing, and the keyway of the at least one diffuser is recessed radially outward from the central bore into the wall.

15. The ESP of claim 14, wherein the keyway of the at least one diffuser is an elongated groove, and the key is an elongated projection.

16. The ESP of claim 13, wherein the retaining ring is at least one of a press-fit lock ring, a snap ring, or a threaded ring.

17. The ESP of claim 13, wherein the retaining ring is at least one of a spiral ring, a constant section ring, a single turn ring, or a nested wave spring.

* * * * *